(12) United States Patent
Henry

(10) Patent No.: US 10,885,529 B2
(45) Date of Patent: Jan. 5, 2021

(54) AUTOMATED UPSELLS IN CUSTOMER CONVERSATIONS

(71) Applicant: ASAPP, Inc., New York, NY (US)

(72) Inventor: Shawn Henry, Brooklyn, NY (US)

(73) Assignee: ASAPP, Inc., New York, NY (US)

( * ) Notice: Subject to any disclaimer, the term of this patent is extended or adjusted under 35 U.S.C. 154(b) by 132 days.

(21) Appl. No.: 15/448,824

(22) Filed: Mar. 3, 2017

(65) Prior Publication Data

US 2018/0253734 A1 Sep. 6, 2018

(51) Int. Cl.
*G06Q 30/00* (2012.01)
*G06Q 30/06* (2012.01)

(52) U.S. Cl.
CPC ....... *G06Q 30/016* (2013.01); *G06Q 30/0631* (2013.01)

(58) Field of Classification Search
CPC .................................. G06Q 30/0601–0645
USPC ................................. 705/26.1–27.2
See application file for complete search history.

(56) References Cited

U.S. PATENT DOCUMENTS

| | | | | |
|---|---|---|---|---|
| 7,437,313 | B1 * | 10/2008 | Mussman | G06Q 30/02 705/14.25 |
| 8,995,643 | B2 | 3/2015 | Ma et al. | |
| 9,104,718 | B1 * | 8/2015 | Levy | G06Q 30/0203 |
| 10,121,116 | B2 * | 11/2018 | Tamblyn | G06Q 10/06393 |
| 2002/0055906 | A1 * | 5/2002 | Katz | G06F 17/60 705/39 |
| 2007/0282703 | A1 * | 12/2007 | Sharpe | G06Q 30/00 705/26 |
| 2008/0244015 | A1 * | 10/2008 | Vanover | G06Q 30/02 709/206 |
| 2011/0010173 | A1 * | 1/2011 | Scott | G10L 15/26 704/235 |
| 2013/0204825 | A1 | 8/2013 | Su | |
| 2014/0067597 | A1 * | 3/2014 | Kirkby | G06Q 30/0631 705/26.7 |
| 2014/0314225 | A1 * | 10/2014 | Riahi | G06Q 30/02 379/265.09 |

(Continued)

FOREIGN PATENT DOCUMENTS

WO 2010009314 A2 1/2010

OTHER PUBLICATIONS

Read, Brendan B. "Real-Time Data, Real Time Results." Customer Interaction Solutions 27.6 (2008): 24(4). ProQuest. Web. Sep. 10, 2020. (Year: 2008).*

(Continued)

*Primary Examiner* — Resha Desai
*Assistant Examiner* — Kennedy Gibson-Wynn
(74) *Attorney, Agent, or Firm* — Pierce Atwood LLP

(57) ABSTRACT

During a conversation between a customer and a customer support representative, suggestions may be presented to the customer support representative to upsell a product to the customer. Information about the customer and/or information about the conversation may be processed by a computer to determine when to suggest the upsell to the customer support representative and the one or more products to be upsold. The determination may be performed by computing features from the information about the customer and the information about the conversation, and processing the features with one or more classifiers.

19 Claims, 9 Drawing Sheets

(56) References Cited

U.S. PATENT DOCUMENTS

| | | | |
|---|---|---|---|
| 2015/0030151 A1* | 1/2015 | Bellini | H04M 3/5175 379/265.06 |
| 2015/0032675 A1 | 1/2015 | Huehn et al. | |
| 2015/0161656 A1 | 6/2015 | Rodriguez et al. | |
| 2015/0178371 A1* | 6/2015 | Seth | G06F 16/3322 707/748 |
| 2015/0195406 A1* | 7/2015 | Dwyer | H04M 3/5175 379/265.07 |
| 2015/0201077 A1* | 7/2015 | Konig | H04M 3/5175 379/265.07 |
| 2015/0254675 A1* | 9/2015 | Kannan | G06Q 30/016 |
| 2015/0302499 A1* | 10/2015 | Erhart | G06Q 30/0613 |
| 2015/0332320 A1 | 11/2015 | Fahner | |
| 2016/0048872 A1 | 2/2016 | Sanchez et al. | |
| 2016/0155063 A1 | 6/2016 | Rich | |
| 2016/0253708 A1* | 9/2016 | Mody | G06Q 30/0269 705/14.66 |
| 2016/0328384 A1 | 11/2016 | Divakaran et al. | |
| 2016/0342683 A1 | 11/2016 | Lim et al. | |
| 2016/0358086 A1 | 12/2016 | Sundram et al. | |
| 2017/0053336 A1 | 2/2017 | Barbour et al. | |
| 2017/0295119 A1* | 10/2017 | Rosenberg | H04L 51/046 |

OTHER PUBLICATIONS

Yang et al. "Hierarchical attention networks for document classification." Proceedings of NAACL-HLT. 2016.
Blei et al. "Latent dirichlet allocation." Advances in neural information processing systems 1 (2002): 601-608.
Wang et al. "Baselines and bigrams: Simple, good sentiment and topic classification." Proceedings of the 50th Annual Meeting of the Association for Computational Linguistics: Short Papers—vol. 2. Association for Computational Linguistics, 2012.
Koren et al. "Matrix factorization techniques for recommender systems." Computer 42.8 (2009).
International Search Report and Written Opinion in PCT/US2018/019731, dated Apr. 24, 2018.
International Preliminary Report on Patentability and Written Opinion in PCT/US2018/019731 dated Sep. 3, 2019.
Extended European Search Report dated Aug. 24, 2020 in European Application No. EP18761602.4 filed Sep. 24, 2019, 10 pages.

* cited by examiner

310

| | |
|---|---|
| Don Miller | 05:03 |
| GENERAL BILLING ISSUE | |
| Waiting for reply... | |
| Ray Jackson | 00:07 |
| PAYMENT | |
| The strange charge on my account is still there. I tried to fix it myself... | |
| Cathy Washington | 01:25 |
| GENERAL BILLING ISSUE | |
| I need to pay the bill to my account and... | |
| Julie Cooper ⊘ | 00:13 |
| INVALID PURCHASE | |
| Waiting for reply... | |
| John Allen ⊘ | 00:13 |
| GENERAL BILLING ISSUE | |
| GREAT! Thanks so much for helping me. | |
| EMPTY SLOT | |
| EMPTY SLOT | |

320

[ TIME OUT ] [ TRANSFER ] [ END ]

BEFORE A REPRESENTATIVE JOINS THE CHAT, PLEASE PROVIDE YOUR PIN AND ACCOUNT NUMBER SO WE CAN VIEW YOUR ACCOUNT.

✓ and 1123454350 ✓

──── 10:10AM ────

You are now connected with Cathy

Hello there Cathy! I'll be more than happy to assist you today. I would love to check on that. Please give me a moment will I look through your account.

Movie 2 was purchased on 10/02 at 11:21 am for $5.99. It will be refunded for the full purchasing price.

There is currently no pin setup for you account, which is why you have unwanted purchases. Would you like me to provide you the steps on how to set it up to your email on file: cathyw@aol.com?

Yes please.

Great! I have successfully sent the email on how to set it up. Also, the refund on Movie 2 has been processed. Your new balance is $120.23.

type here

330

🔍 search...

Do not upsell. Upsell score is 5 out of 100. — 351

Knowledge Base | Customer History | • Customer Profile

Fig. 3B

AUTOMATED UPSELLS IN CUSTOMER CONVERSATIONS

FIELD OF THE INVENTION

The present invention relates to automatically presenting upsells to customers.

BACKGROUND

Companies need to efficiently interact with customers to provide services to their customers. For example, customers may need to obtain information about services of the company, may have a question about billing, or may need technical support from the company. Companies interact with customers in a variety of different ways. Companies may have a website and the customer may navigate the website to perform various actions. Companies may have an application ("app") that runs on a user device, such as a smart phone or a tablet, that provides similar services as a website. Companies may have a phone number that customers can call to obtain information via interactive voice response or to speak with a customer service representative. Companies may also respond to customers using various social media services, such as Facebook or Twitter.

Companies may desire to suggest additional products to customers so that customers may be made aware of products that they may enjoy receiving and to generate additional sales for the company. Suggesting a product to a customer may be referred to as an upsell of the product to the customer. An upsell may be presented to a customer during a conversation between the customer and the customer service representative. During some conversations, an upsell may be annoying to a customer and unlikely to succeed. For example, when the customer is complaining to the company. In other conversations, upsells may be well received by a customer and be more likely to succeed. For example, where a customer is inquiring about a product, it may be helpful to inform the customer about other similar products. Upselling a product to a customer at an appropriate time may provide a better experience for the customer and also increase sales for the company.

BRIEF DESCRIPTION OF THE FIGURES

The invention and the following detailed description of certain embodiments thereof may be understood by reference to the following figures:

FIGS. 3A and 3B are examples of user interfaces for a customer service representative for responding to a customer and receiving suggesting upsells.

DETAILED DESCRIPTION

Figure 1A:
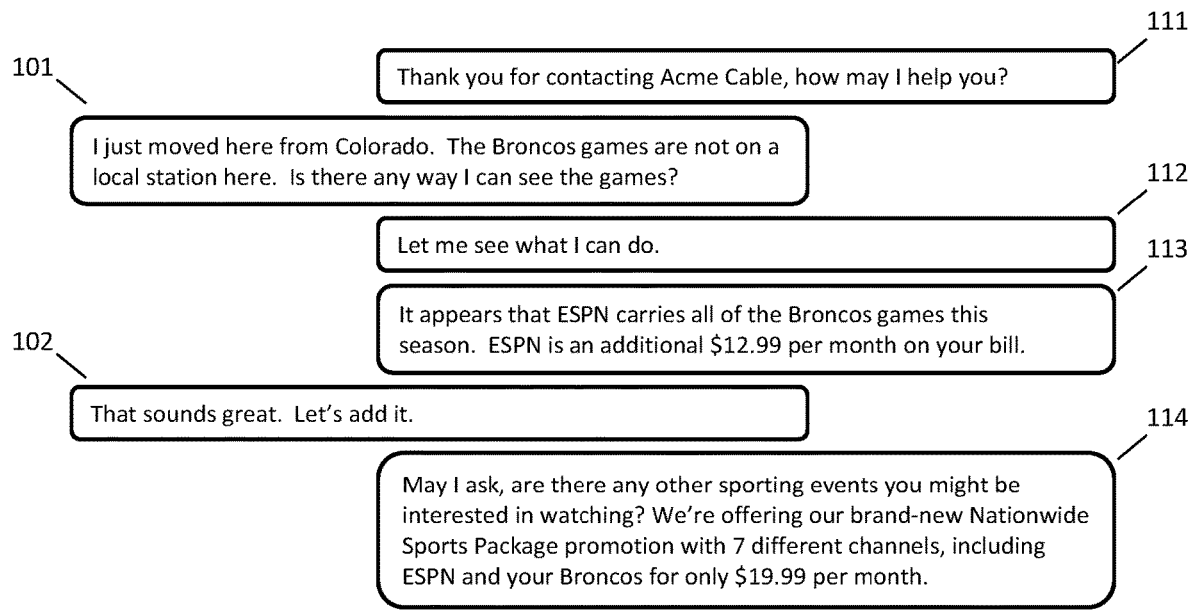
FIGS. 1A and 1B are example conversations between a customer and a customer service representative.

Described herein are techniques for improving the efficacy of product upsells. Upsells may be more likely to succeed when they are presented at some times than other times. For example, when a customer is clearly upset with a company, that is a bad time for an upsell. When a customer is calling to add products to his account, that may be a good time to upsell other products. Upsells may also be more likely to succeed based on the choice of product to be upsold. For example, when a customer is calling to ask about HBO, the customer may be receptive to an upsell for Showtime but may not be receptive to an upsell for a new wireless router.

The following are some factors that may be relevant to determining the timing and selection of upsells. Whether the upsell is timely—an upsell may be more successful after the customer's issues have been resolved or if the upsell would resolve the customer's issue. Whether the upsell is topical—an upsell may be more successful if it is related to the conversation at hand. Whether the upsell is sensitive—an upsell may be more successful depending on the mood of the customer. Whether the upsell is appropriate for the customer—an upsell may be more successful if it is for a product that a customer is likely to be interested in.

Information about the customer (e.g., from the customer's account) and information about a conversation with a customer may be used to improve the timing of upsells and also the selection of products to be upsold. For example, products currently provided to the customer may be obtained from the customer's account and used to determine the timing and selection of upsells. Information from the conversation that may be useful for the timing and selection of upsells includes the content of the conversation (e.g., the words of the conversation), a topic of the conversation (e.g., Internet or cable television), and a sentiment of the customer (e.g., is the customer happy or angry).

In some implementations, a customer may be speaking with a customer support representative (CSR), and an upsell may be suggested to the CSR during the conversation, such as by presenting the suggested upsell on a user interface used by the CSR. The CSR may then decide whether or not to upsell that product. In some implementations, a customer may be using automated customer support, where responses to the customer's requests are determined by a computer, and a product upsell may be included in the automated responses. A conversation between a customer and a CSR or between a customer and automated customer support may take any appropriate form. Communications between them may be in the form of text, speech, video, or any other form of communication.

A company may provide both products and services to a customer. For clarity of presentation, a product, as used herein, includes any product or service that may be provided by a company to a customer. For example, a product includes physical goods, digital goods, and services. A product upsell may also include the upsell of physical goods, digital goods, and services.

Figure 1B:
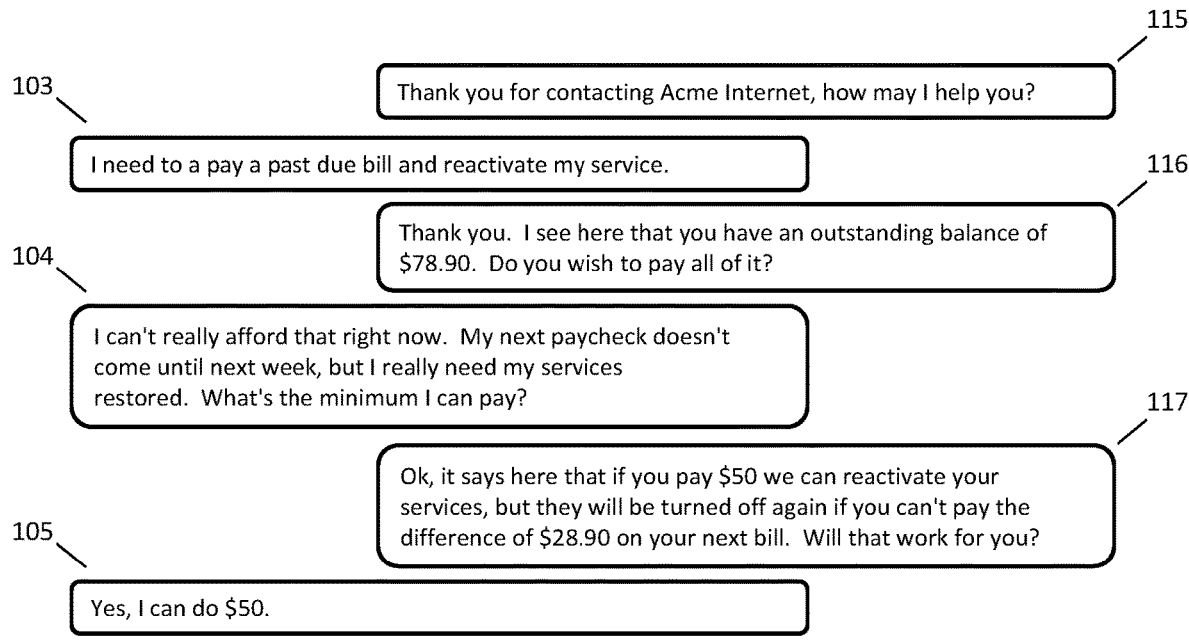

FIGS. 1A and 1B are example conversations between a customer and a customer service representative. In FIGS. 1A and 1B communications 101 to 105 are from a customer and communications 111 to 117 are from a CSR or automated customer support.

FIG. 1A is an example of a conversation where an upsell may be more likely to succeed. At communication 113, the company has solved the customer's problem of wanting to watch Broncos football games, and at communication 102 the customer appears happy with the proposed solution. Because of this, a product upsell of an additional sports package is presented by the company at communication 114.

FIG. 1B is an example of a conversation where an upsell may be less likely to succeed. In this conversation, the customer has had his service disconnected and is calling to get the service reactivated. At communication 117, the company proposes a solution to the customer, and at communication 118, the customer accepts the solution, but an upsell may be less likely given the conversation. The customer has had his service disconnected so the customer may be unhappy with the company, and the customer is short money so the customer is likely not willing to pay for an additional product. Accordingly, an upsell is not done in FIG. 1B.

Figure 2:
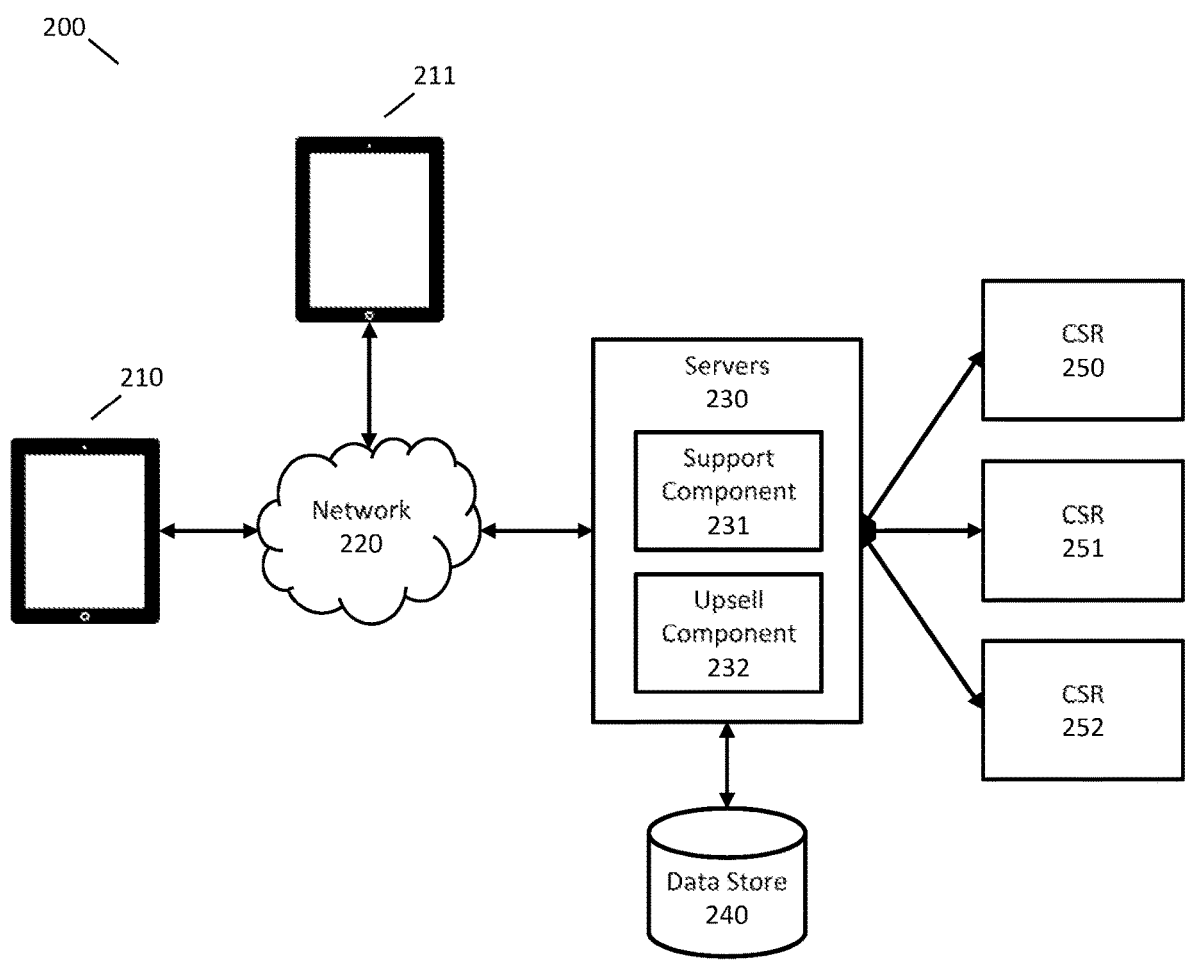
FIG. 2 is an example system for suggesting upsells to a customer service representative or upselling a product during an automated customer support session.

FIG. 2 illustrates a system 200 for suggesting an upsell to a CSR in responding to a request of a customer or for doing an upsell in automated customer support. In FIG. 2, a customer may use customer device 210 to communicate with a company. Customer device 210 may include any appropriate device, such as a computer, smart phone, tablet, wearable device, or Internet of things device. The customer may submit the request using any appropriate techniques, such as typing or speaking a request to an app running on customer device 210 (e.g., an app of a particular company or a third-party app created for processing customer requests), typing or speaking a request on a web page, sending a text message, or sending an email. As used herein, a text message includes any message sent as text including but not limited to a message sent using SMS (short message service) or a special purpose application (e.g., Facebook messenger, Apple iMessage, Google Hangouts, or WhatsApp). Other customers may also interact with system 200, such as another customer using customer device 211.

The customer's request may be sent by customer device 210 to servers 230 of the company via network 220. Network 220 may include any appropriate networks, such as a local area network, a wide area network, the Internet, Wi-Fi, or a cellular data network. The request may be sent using any appropriate transmission protocols that include sending one or more of the text of the message or audio of the customer speaking the request. Where the customer speaks a request to customer device 210, speech recognition may be performed by customer device 210, at servers 230, or by another component of system 200.

Servers 230 receive the customer request and may coordinate further processing of the customer request. Servers 230 may include components comprising particular functionality or may be connected to other computing devices that include such components. For example, servers 230 may include support component 231 that facilitates a customer support session between a customer and a customer service representative or between a customer and automated customer support. For example, support component 231 may select a CSR (e.g., CSR 250, 251, or 252), may transmit a message from a customer to a selected CSR, may transmit a response from a CSR back to the customer, or may generate an automated response to a customer.

Servers 230 may include upsell component 232 to suggest upsells to a CSR or to perform an upsell during automated customer support. For example, upsell component 232 may process messages between a customer and the company and information about the customer to determine if and when to do a product upsell and also select the product for the upsell. Information about customers may be stored in a data store, such as data store 240 and retrieved by upsell component 232.

Figure 3A:
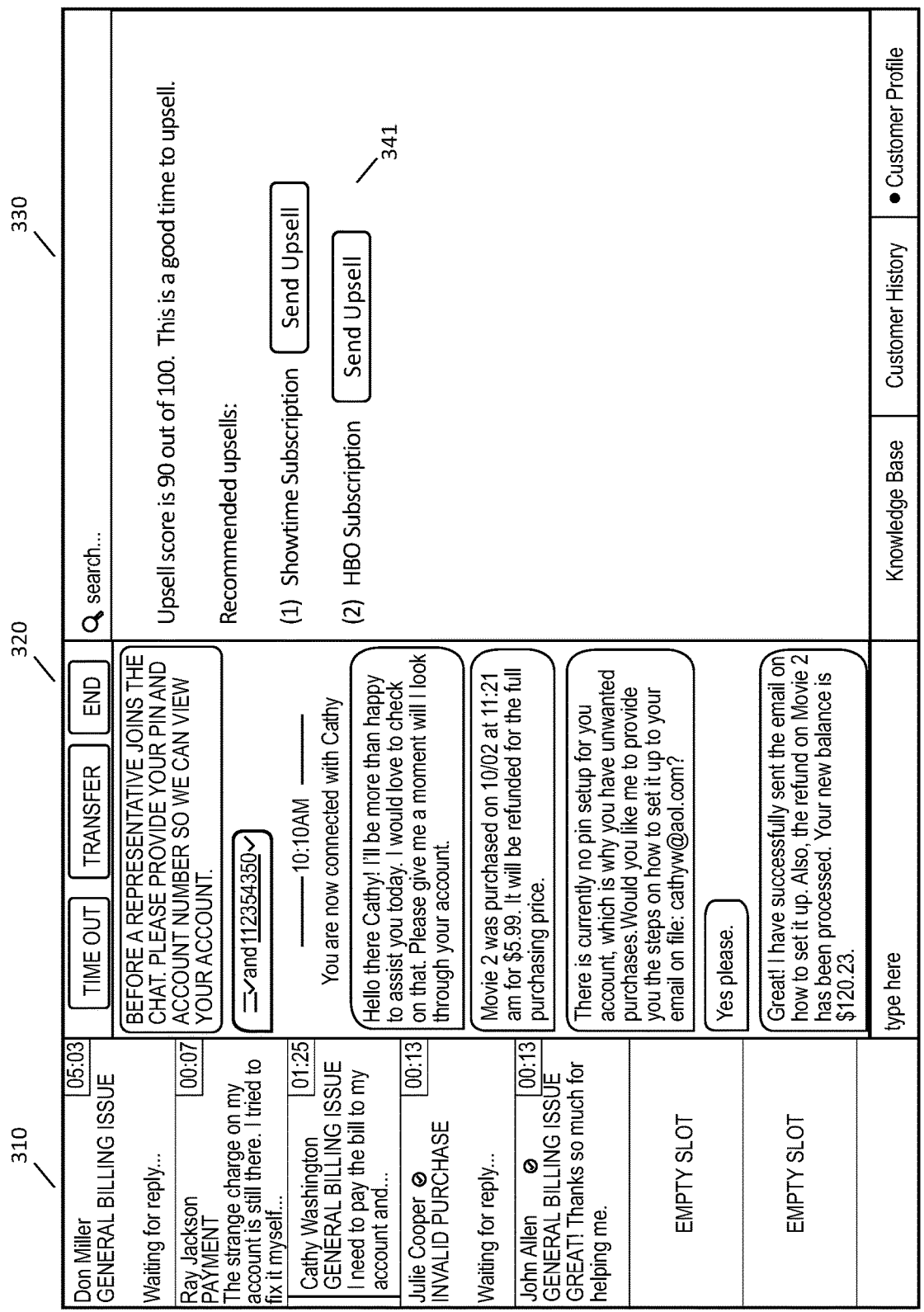

FIGS. 3A and 3B are examples of user interfaces for a CSR for responding to a customer and receiving suggested upsells. The UI of FIGS. 3A and 3B includes different portions that contain different types of information. For example, FIGS. 3A and 3B include a customer list portion 310 that includes a list of customers who the CSR is currently communicating with. In this example, the CSR is communicating with five different customers, and the customer named Cathy Washington is a selected or active customer. FIGS. 3A and 3B also includes a conversation portion 320 that shows messages between the customer and the CSR.

FIGS. 3A and 3B also includes an upsell portion 330 that may present suggested upsells to the CSR. In FIG. 3A, upsell portion 330 presents a recommendation 341 to upsell and presents two suggestions of products to be upsold. In FIG. 3B, upsell portion 330 presents a recommendation 351 to the CSR to not upsell a product to the customer. The recommendations to upsell or not to upsell may be presented in any appropriate way. In some implementations, a score may be presented indicating a likelihood of success of an upsell, such as on a scale of 1 to 100. Where a recommendation to upsell is presented, the recommendation may include, for example, information identifying the suggested products, links to obtain more information about the products, or buttons to cause the upsell to be presented to the customer. For example, clicking on the button may cause a pre-generated or automatically generated communication to be sent to the customer to inform the customer about the product. Where the recommendation is not to upsell a product, the recommendation may include, for example, reasons for not doing an upsell, such as a determination that the customer is upset.

Now described are techniques for processing information about a customer and messages between a customer and a company (e.g., a CSR of the company or automated customer support provided by the company) to determine whether to present an upsell, and if it is determined to present an upsell, one or more products to be upsold.

Figure 4:
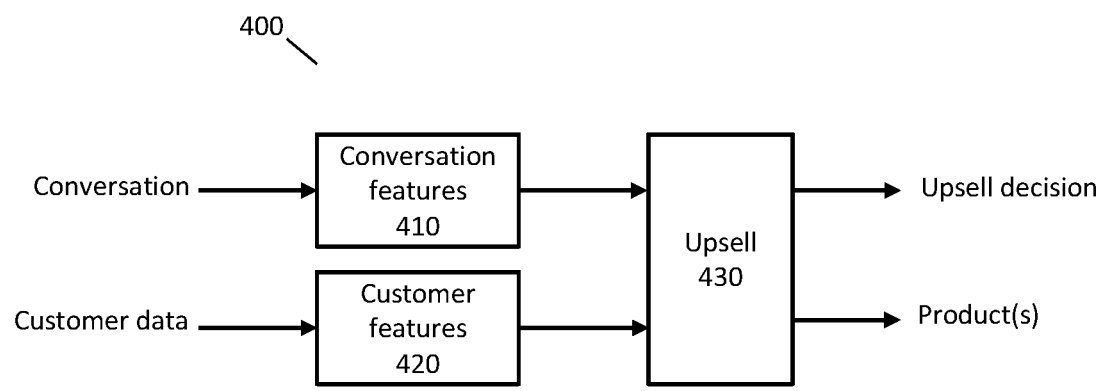
FIG. 4 is an example system for upselling a product with a single classifier.

FIG. 4 is an example system 400 for determining whether to upsell a product and products to be upsold. System 400 uses at least two types of information: information about a conversation between the customer and the company and information about the customer (e.g., customer data from a customer account).

The information about the conversation may include, for example, the text of messages transmitted between the customer and the company, audio of messages transmitted between the customer and the company, the timing of messages, or any other information about the conversation. The information about the conversation may include only the most recent message, a number of most recent messages, all messages in the conversation, and/or messages from previous conversations with the customer.

The information about the conversation may be processed by conversation features component 410 to generate conversation features, such as a feature vector of features relating to the conversation. Any appropriate techniques may be used to generate conversation features from the information about the conversation. For example, conversation features may be computed using one or more of bag of words features, bag of n-grams features, term frequency-inverse document frequency features, a matrix of word vectors, neural network features (such as features computed using a multi-layer perceptron, a convolution neural network, or a recurrent network), or any combinations of the foregoing features. The conversation features may include, for example, features that describe the content of the conversation, features relating to the topic of the conversation, and features relating to the sentiment or mood of the customer.

The information about the customer may include any information that a company may store about a customer. The information about the customer may include, for example, demographic information, products currently provided to the customer, products previously provided to the customer, and billing information. The information about the customer may be retrieved from a customer account, and may be retrieved at any point during the conversation between the customer and the company.

The information about the customer may be processed by customer features component 420 to generate customer features, such as a feature vector of features relating to the customer. Any appropriate techniques may be used to generate customer features from the information about the customer. For example, the customer features may include boolean values indicating information about the customer (e.g., a Boolean indicating whether the customer has an HBO subscription or has an overdue balance) or collaborative filtering features, as described in greater detail below.

Upsell component 430 may receive the conversation features and the customer features and process them with one or classifiers to determine whether to upsell a product and one or more products to be upsold. Upsell component 430 may use any appropriate classifier to determine whether to upsell a product and the products to be upsold. For example, upsell component 430 may use one or more of decision classifier (such as a random forest or multinomial random forest), a probabilistic classifier (such as a naive Bayes classifier or a multinomial naive Bayes classifier), a linear classifier (such as a logistic regression classifier or a multinomial logistic regression classifier), a support vector machine (or a committee of support vector machines), or a neural network (such as an multi-layer perceptron or a deep averaging network with or without multinomial output).

In some implementations, upsell component 430 may output a boolean value that indicates whether an upsell should be performed or a score indicating the suitability of the conversation for an upsell (e.g., on a scale of 1 to 100). Where upsell component 430 outputs a score for the suitability of the conversation for an upsell, the score may be compared to a threshold to determine whether to do an upsell.

In some implementations, upsell component 430 may output a score for each product that is available to be upsold to the customer. When it is determined to do an upsell, the product scores may be used to select the products to be upsold. For example, a highest scoring product may be selected, or all products with a score above a threshold may be selected.

Where upsell component 430 does not output a boolean value indicating whether an upsell should be performed and does not output a score indicating the suitability of the conversation for an upsell, the product scores may be used to determine whether an upsell should be performed. For example, the highest product score may be compared to a threshold to determine whether an upsell should be performed.

When it is determined to do an upsell (using any of the techniques described above), the one or more selected products may then be suggested to a CSR for upselling to the customer or an upsell may be performed by automated customer support.

Figure 5:
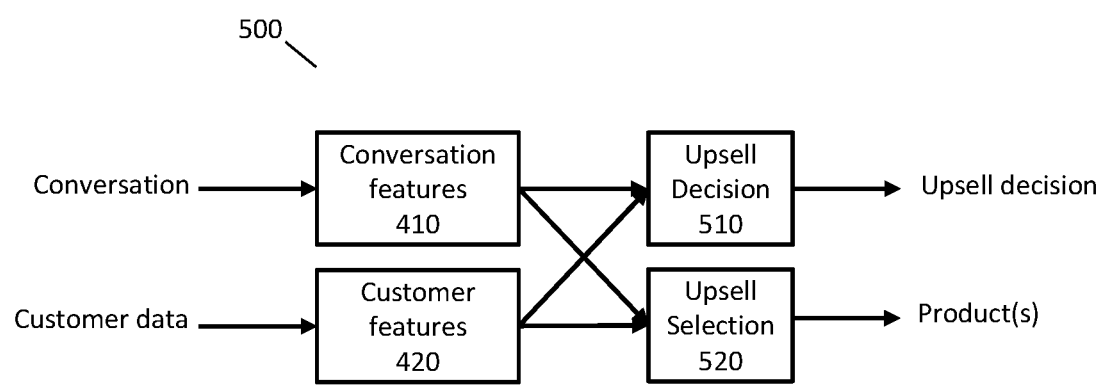
FIG. 5 is an example system for upselling a product with more than one classifier.

FIG. 5 is an example system 500 for determining whether to upsell a product and products to be upsold that uses more than one classifier. System 500 may use any of the information about the conversation, the information about the customer, conversation features component 410, and customer features component 420 described above. Instead of upsell component 430, system 500 may have an upsell decision component 510 and an upsell selection component 520.

Upsell decision component 510 may process one or both of the conversation features and the customer features to determine whether an upsell should be performed. Upsell decision component 510 may use any of the classifiers described above, and may provide any appropriate output such as a boolean or a score indicating the suitability of the conversation for an upsell.

Upsell selection component 520 may process one or both of the conversation features and the customer features to select one or more products to be upsold. Upsell selection component 520 may use any of the classifiers described above, and may provide any appropriate output such as a score for each product that is available to be upsold.

In some implementations, the processing of upsell decision component 510 may be performed before the processing of upsell selection component 520, and the processing of upsell selection component 520 may only be performed if it is determined that an upsell should be performed. In some implementations, the processing of upsell decision component 510 and the processing of upsell selection component 520 may be performed simultaneously or in parallel, and the selected products may only be used if it is determined to do an upsell.

Figure 6:
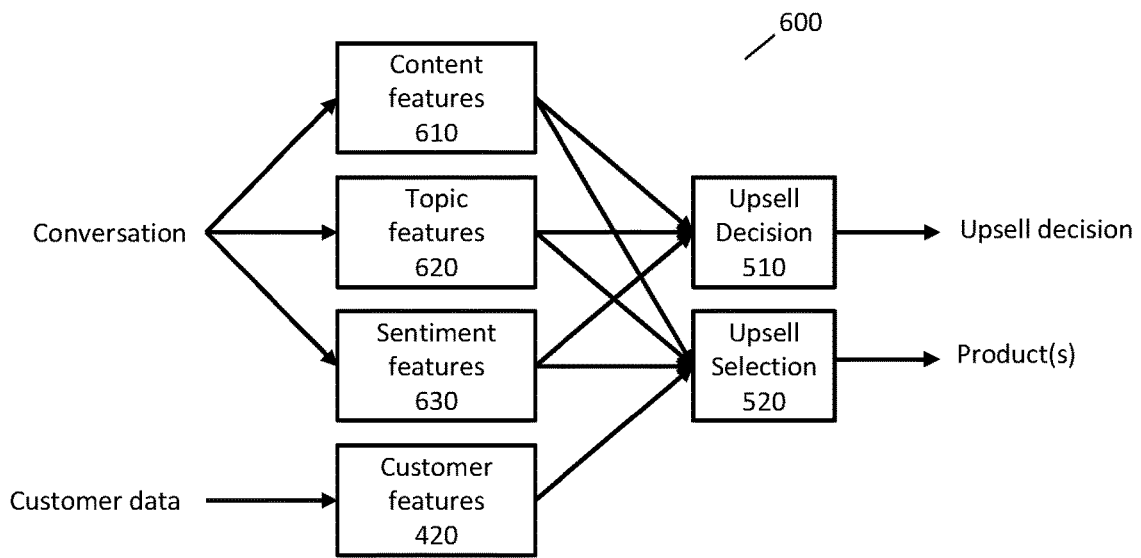
FIG. 6 is an example system for upselling a product using multiple types of conversation features.

FIG. 6 is an example system 600 for upselling a product using multiple types of conversation features. System 600 may use any of the information about the conversation, the information about the customer, customer features component 420, upsell decision component 510, and upsell selection component 520 described above. Instead of conversation features component 410, system 500 may have multiple types of conversation features, such as features generated by content features component 610, topic features component 620, and sentiment features component 630.

Content features component 610 may process the information about the conversation and generate content features indicating the content of the messages in the conversation, such as words or bigrams in the messages. Content features component 610 may generate any features that indicate the content of messages in a conversation, such as a TFIDF (term frequency-inverse document frequency) weighted bag of bigrams representation of the conversation. For example, content features component 610 may process the w most recent messages, and generate a TFIDF vector for each message. Where the vocabulary (e.g., of words and/or bigrams) has size V, each vector will have length V. The TFIDF vectors for each of the w messages may then be concatenated to generate a content feature vector of length w times V. In some implementations, content features may include word embeddings (e.g., as obtained using a Word2Vec model or a GloVE algorithm) and/or context features (e.g., as described in U.S. patent application Ser. No. 15/383,603, filed on Dec. 19, 2016, which is hereby incorporated by reference in its entirety).

Topic features component 620 may process the information about the conversation and generate topic features where each topic feature is a score indicating a match between the conversation and a corresponding topic. In some implementations, the topics may be specified in advance and have a human understandable meaning. In some implementations, the topics may be determined automatically from training data and may not have a readily understandable meaning to a person. Topic features component 620 may generate any features that indicate a topic of the conversation, such as generating features by applying latent Dirichlet allocation to the information about the conversation to generate a fixed-length topic vector where each element of the topic vector is a score corresponding to a topic.

In some implementations, topic features component 620 may generate topic features using a topic model. A topic model may be trained on a corpus of training data (e.g., existing customer support logs), and an example topic model is a latent Dirichlet allocation model. After the topic model has been trained, the topic model may be used to process the messages in a conversation and generate topic features. In some implementations, a first message in a conversation may be processed to generate a first topic feature vector. Afterwards, a second message in the conversation may be processed to generate a second topic feature vector (e.g., by updating the first topic feature vector). In this manner, topic features may be generated after each message in the conversation.

Sentiment features component 630 may process the information about the conversation and generate sentiment features that indicate a sentiment of the conversation. Sentiment features component 630 may generate any features that indicate a sentiment, attitude, affective state, or emotional state of the customer from the messages transmitted by the customer. In some implementations, sentiment features component 630 may process all messages between the customer and the CSR and, in some implementations, may only process messages received from the customer. In some implementations, sentiment features component 630 may generate sentiment features using a naïve Bayes support vector machine that generates a sentiment feature vector. The sentiment feature vector may be a distribution over possible sentiments of the customer. For example, the sentiment feature vector may have length 5, where the first element is a score indicating if the customer is really unhappy and the fifth element is a score indicating if the customer is really happy.

In some implementations, sentiment features component 630 may generate sentiment features using a sentiment model, such as a naïve Bayes support vector machine. The sentiment model may be trained by a corpus of training data, such as existing customer support logs where each conversation has been assigned a sentiment (e.g., manually assigned by a person reviewing the conversation). After the sentiment model has been trained, the sentiment model may be used to process the messages in a conversation and generate sentiment features. As above, sentiment features may be generated after each message in the conversation.

Upsell decision component 510 and upsell selection component 520 may each process some or all of the above conversation features and/or the customer features. The different features may be concatenated to create an overall feature vector to be input to the upsell decision component 510 and upsell selection component 520. For example, a first feature vector may be created by concatenating content features, topic features, and sentiment features, and upsell decision component 510 may process this first feature vector to determine whether an upsell should be done. A second feature vector may be created by concatenating content features, topic features, sentiment features, and customer features, and upsell selection component 520 may process this second feature vector to select a product to upsell. Any combination of features may be processed by each of upsell decision component 510 and upsell selection component 520.

Figure 7:
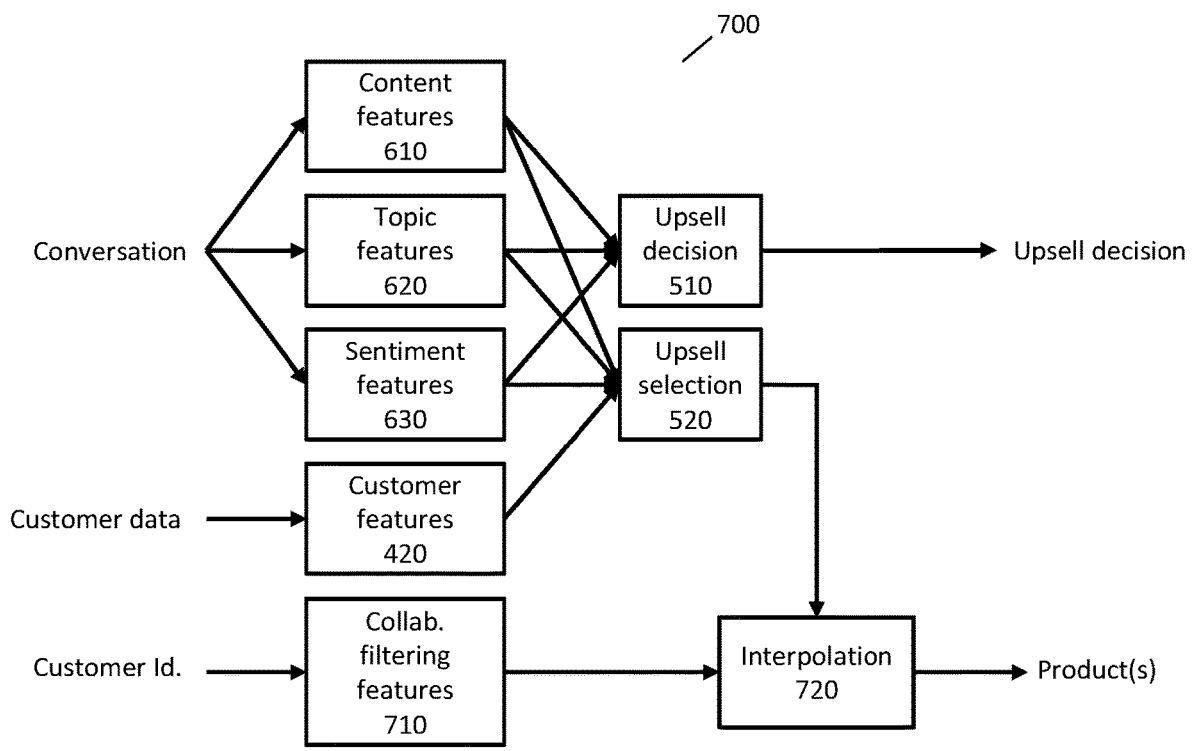
FIG. 7 is an example system for upselling a product using collaborative filtering.

FIG. 7 is an example system for upselling a product using collaborative filtering. System 700 may use any of the information about the conversation, the information about the customer, customer features component 420, upsell decision component 510, upsell selection component 520, content features component 610, topic features component 620, and sentiment features component 630 described above.

System 700 may include collaborative filtering features component 710 that processes information about the customer to produce collaborative filtering features. Collaborative filtering features may include any features that predict preferences of a customer given data about a large number of other customers. For example, a company may have customer data that indicates the products provided to each customer. Where a large number of customers receive both product A and product B, it may be determined that another customer who receives product A may also be interested in receiving product B.

Any appropriate techniques for determining collaborative filtering features may be used. In some implementations, a collaborative filtering model may be determined using data indicating the products received by a large number of customers. For example, a matrix may be created where each row of the matrix corresponds to a customer and each column corresponds to a product. For each element of the matrix, it may be set to 1 if the customer receives the corresponding product and 0 otherwise. Techniques such as matrix completion (e.g., least squares matrix completion) may then be used to determine a score for each of the 0 entries of the matrix where the score indicates a predicted preference of the customer for the corresponding product. For example, a high score may indicate that a customer is likely to want to receive the product and a low score may indicate that a customer is unlikely to want to receive the product.

Collaborative filtering component 710 may receive an identifier of a customer, and use the identifier of the customer and a collaborative filtering model (e.g., a completed matrix) to generate the collaborative filtering features. For example, the collaborative filtering features may correspond to the row of the matrix corresponding to the customer, and have a 1 for each product the customer currently receives and a score for each of the other products that indicates a predicted preference for the corresponding product.

In some implementations, upsell selection component 520 may generate a first vector with a score for each of the available products as described above. Upsell selection component may use any features described above other than the collaborative filtering features. Collaborative filtering features component 710 may generate a second vector with a score for each of the available products. Interpolation component 720 may then combine the first vector and the second vector to create a third vector with a score for each of the available products. Interpolation component may use any appropriate techniques for combining the first and second vectors, such as performing an element by element weighted sum of the first and second vectors.

The third vector generated by interpolation component 720 may then be used to select one or more products to be upsold as described above. For example, a top scoring product may be selected or all products with a score above a threshold may be selected.

In some implementations (not shown in FIG. 7), upsell component 520 may receive the collaborative filtering features as input, along with any of the other features described above, and generate a vector with a score for each of the available products to be sold. This vector may then be used directly to select one or more products and need not be interpolated with another vector.

Figure 8:
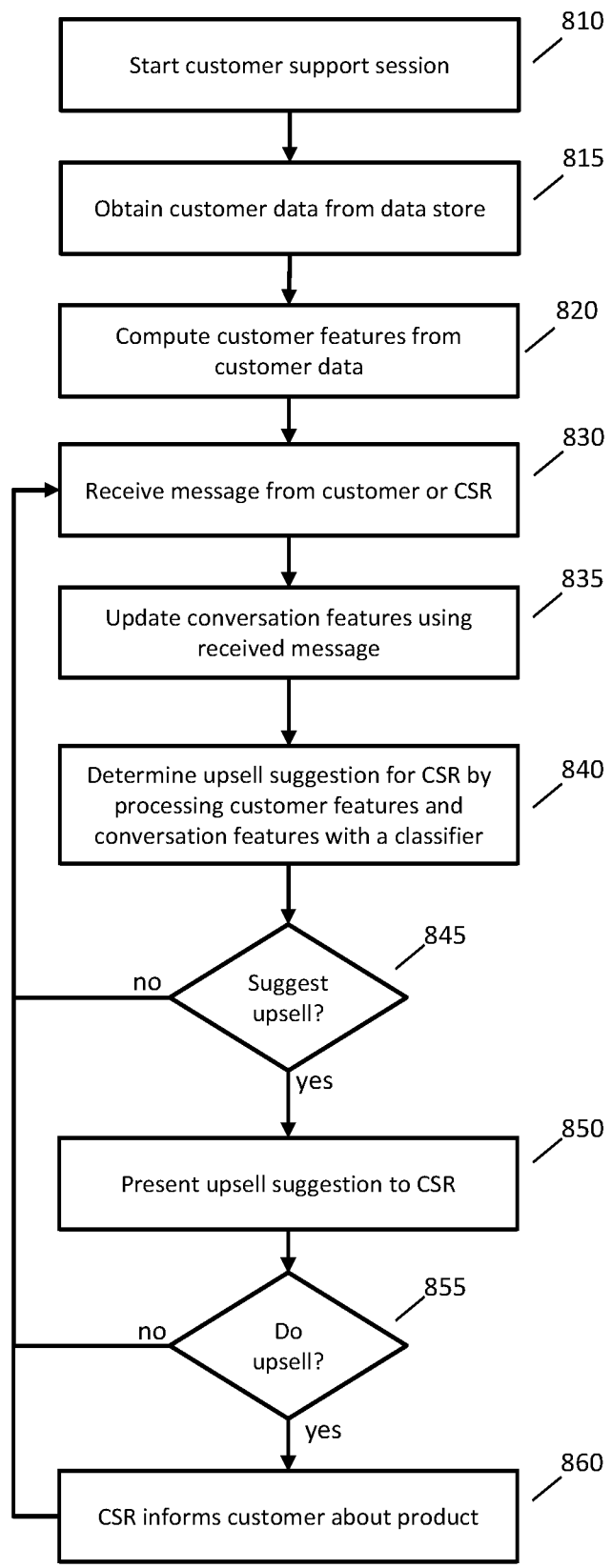
FIG. 8 is a flowchart of an example implementation of suggesting an upsell to a customer service representative during a conversation with a customer.

FIG. 8 is a flowchart of an example implementation of suggesting an upsell to a CSR. In FIG. 8, the ordering of the steps is exemplary and other orders are possible, not all steps are required and, in some implementations, some steps may be omitted or other steps may be added. The process of the flowcharts may be implemented, for example, by any of the computers or systems described herein.

At step 810, a customer support session between a customer and a CSR is started. The support session may be started using any appropriate techniques, such as by sending a text message (e.g., SMS), sending an email message, using an application or app (e.g., Facebook or a company specific app), or using a webpage. The session may be started by either the customer or the CSR, and they may communicate via text, voice, or other means of interactive communication. A support session may comprise any number of interactions between the customer and the CSR, such as the customer and CSR sending each other messages or speaking to each other.

At step 815, customer data is obtained from a data store of customers. For example, a customer user name or identification number may be used to retrieve the data from the data store using a query. The customer data may include any relevant data about the customer, such as products currently or previously provided to the customer.

At step 820, customer features are computed from the customer data. For example, in some implementations, the customer features may include boolean values indicating the products provided to the customer. In some implementations, the customer features may include collaborative filtering features.

At step 830, a message is received from the customer or the CSR. For example, the customer may send a text message to the CSR or vice versa.

At step 835, conversation features are computed using the received message and optionally one or more previous messages between the customer and the CSR. The conversation features may include any combination of the conversation features described above, such as content features, topic features, sentiment features, or context features. In some implementations, conversation features from a previous iteration of the flowchart (for a previous message) may be updated using the received message.

At step 840, it is determined whether to present a suggestion to the CSR to upsell a product to the customer by processing one or both of the conversation features and the customer features with one or more classifiers. Any of the techniques described above may be used to determine whether to present an upsell suggestion to the CSR. At step 840, one or more products may be selected as suggested upsells to the CSR. The determination to suggest an upsell and the selection of products may be performed in a single step or may be performed in multiple steps, and products may only be selected if it is determined in a previous step to suggest an upsell.

At step 845, if it is determined not to present a suggested upsell to the CSR, then processing may proceed to step 830 where another message between the customer and the CSR is received. If it is determined to present a suggested upsell to the CSR, then processing may proceed to step 850, where the suggested upsell is presented to the CSR. Any appropriate techniques may be used to suggest the upsell to the CSR, such as the user interface of FIG. 3.

At step 855, the CSR may decide whether or not to upsell a product to the customer. The CSR may decide whether to upsell the product for any reason. For example, the CSR may use his judgment to determine that an upsell is not appropriate or helpful at the current point in the conversation, or the customer may send another message while the CSR is considering the upsell. Where the CSR decides not to suggest an upsell (or the customer sends another message while the CSR is considering the upsell), processing may proceed to step 830 where another message between the customer and the CSR is received.

Where the CSR decides to upsell a suggested product, the CSR may use any appropriate techniques to do the upsell. For example, the CSR may use a script corresponding to the upsell or may select a user interface component that sends a previously generated or automatically generated message to the customer relating to the upsell. After step 860, processing may proceed to step 830 where another message between the customer and the CSR is received. For example, the received message may be a response from the customer relating to the upsell.

Steps 830 to 860 may be repeated any number of times during the customer support session. At each iteration, no upsell may be suggested to the CSR or one or more suggested upsells may be presented to the CSR. The upsell suggestion may change at each iteration. For example, for a first iteration, no upsell may be suggested; for a second iteration, an upsell for a first product may be suggested; for a third iteration, an upsell for a second product may be suggested; and for a fourth iteration, no upsell may be suggested.

Figure 9:
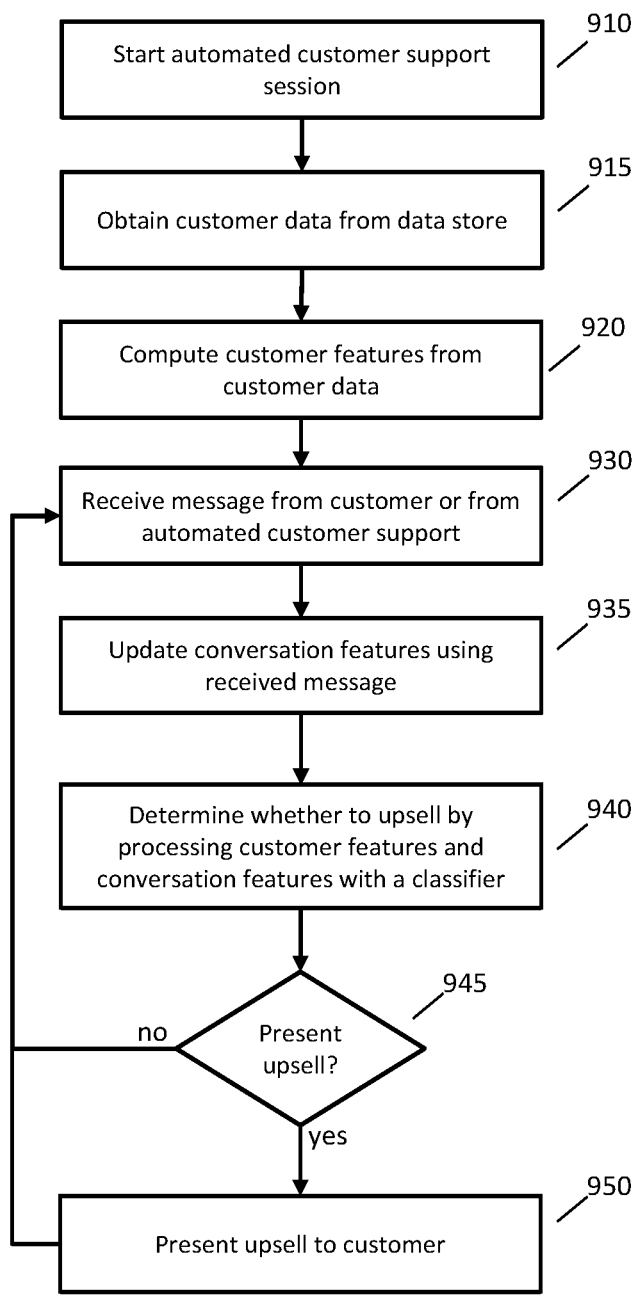
FIG. 9 is a flowchart of an example implementation of upselling a product to a customer during an automated customer support session.

FIG. 9 is a flowchart of an example implementation of upselling a product to a customer during an automated customer support session. In FIG. 9, the ordering of the steps is exemplary and other orders are possible, not all steps are required and, in some implementations, some steps may be omitted or other steps may be added. The process of the flowcharts may be implemented, for example, by any of the computers or systems described herein.

At step 910, an automated customer support session is started with a customer. An automated customer support session includes any techniques for responding to customer support requests without the involvement of a person. For example, techniques such as artificial intelligence, machine learning, speech recognition, natural language processing, or text-to-speech processing may be used to understand a customer request and formulate an appropriate response to the customer request using one or more computers. The interactions between the customer and automated customer support may be in the form of text and/or speech.

At steps 915 and 920, customer data is obtained and customer features are generated using the customer data. These steps may be performed using any of the techniques described above for steps 815 and 820.

At step 930, a message is received from the customer or from automated customer support. For example, the customer may send a text message or a computer may generate a text message to be sent to the customer.

At step 935, conversation features are updated using the received message, such as by using any of the techniques described for step 835.

At step 940, it is determined whether to upsell a product to the customer by processing one or both of the conversation features and the customer features with one or more classifiers. Any of the techniques described above may be used to determine whether to upsell a product to the customer. The determination to do an upsell and the selection of a product to be upsold may be performed in a single step or may be performed in multiple steps, and a product may only be selected if it is determined in a previous step to do an upsell.

At step 945, if it is determined not to upsell a product to the customer, then processing may proceed to step 930 where another message between the customer and automated customer support is received. If it is determined to upsell a product to the customer, then processing may proceed to step 950, where the upsell is presented to the customer. Any appropriate techniques may be used to upsell the product to the customer, such as presenting automatically generated text to inform the customer about the product.

After step 950, processing may proceed to step 930 where another message between the customer and automated customer support is received. For example, the received message may be a response from the customer relating to the upsell. As above, steps 930 to 950 may be performed any number times during the automated customer support session.

The components described herein may be configured or trained using a corpus of training data. A corpus of training data may include any relevant training data for training the components, such as existing customer support sessions. The training data may be annotated, either using automated processing or by a human. For example, the training data may be annotated to indicate points in a conversation where an upsell was performed, where an upsell was performed and was successful, where an upsell was performed and was not successful, or where an upsell is likely to be successful or unsuccessful (e.g., as determined by a person reviewing the conversation). The training data may also be annotated to identify products that were upsold in the conversation or products that are well suited for an upsell in the conversation (e.g., as determined by a person).

For training an upsell decision classifier, the training data may be annotated to indicate, after each message of the conversations in the training data, whether an upsell should be performed after that message. The annotated training data and features obtained from the training data (e.g., conversation features and customer features) may be used to train the upsell decision classifier, such as any of the classifiers described above.

For training an upsell selection classifier, the training data may be annotated to indicate, after each message of the conversations in the training data, a list of products that are well suited to be upsold after that message. The annotated training data and features obtained from the training data (e.g., conversation features and customer features) may be used to train the upsell selection classifier, such as any of the classifiers described above.

Similarly, a single classifier for both determining whether to do an upsell and selecting one or more products to be upsold may be trained using both types of annotations.

The operations of the techniques described herein may be used to generate additional training data for later updating any of the classifiers described herein. For example, when an upsell is suggested to a CSR, the CSR performing the upsell may indicate that it was a good suggestion and the CSR not using the upsell may indicate that the upsell was a bad suggestion. Additional training data may be generated with an annotation indicating whether or not a CSR used a suggested upsell, and this additional training data may be used to further train the classifiers.

Figure 10:
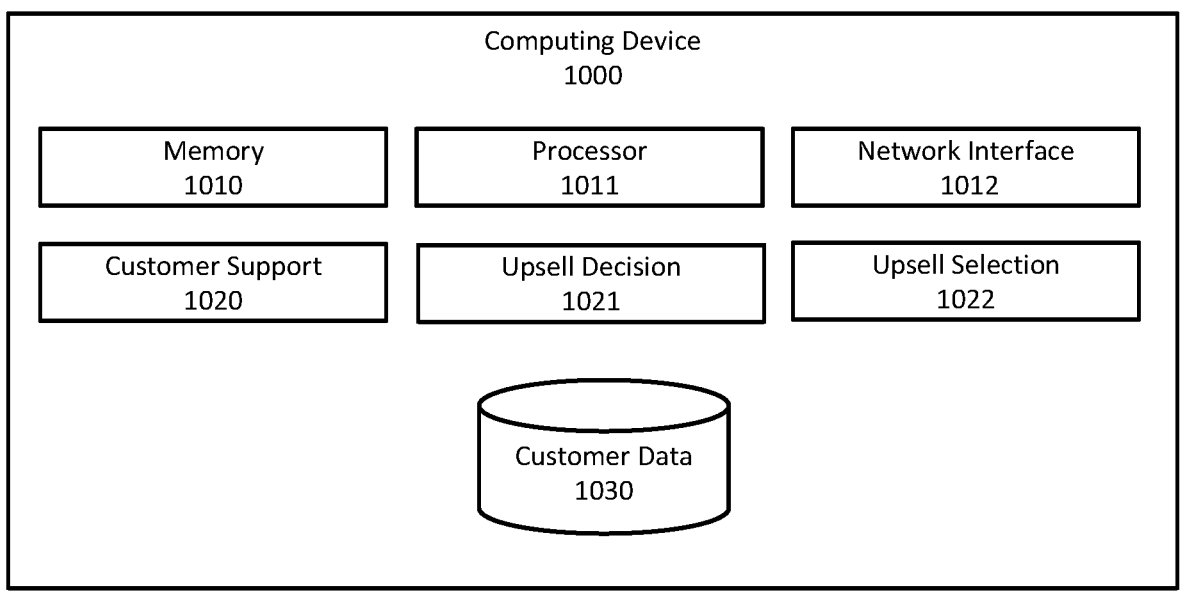
FIG. 10 is an exemplary computing device that may be used to upsell products.

FIG. 10 illustrates components of one implementation of a computing device 1000 for implementing any of the techniques described above. In FIG. 10, the components are shown as being on a single computing device 1000, but the components may be distributed among multiple computing devices, such as a system of computing devices, including, for example, an end-user computing device (e.g., a smart phone or a tablet) and/or a server computing device (e.g., cloud computing).

Computing device 1000 may include any components typical of a computing device, such as volatile or nonvolatile memory 1010, one or more processors 1011, and one or more network interfaces 1012. Computing device 1000 may also include any input and output components, such as displays, keyboards, and touch screens. Computing device 1000 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1000 may have a customer support component 1020 that provides functionality for allowing a customer and a CSR to interact with each other in a support session or providing automated customer support. Computing device 1000 may have an upsell decision component 1021 that may determine whether to suggest or present an upsell using one or more of conversation features and customer features. Computing device 1000 may have an upsell selection component 1022 that selects one or more products to be upsold using one or more of conversation features and customer features.

Computing device 1000 may include or have access to various data stores. Data stores may use any known storage technology, such as files or relational or non-relational databases. For example, computing device 1000 may have a customer data store 1030 that stores information about customers, such as products received by the customers.

The techniques described above may be combined with any of the techniques described in U.S. patent application Ser. No. 15/254,008 filed on Sep. 1, 2016, which is herein incorporated by reference in its entirety for all purposes. For example, any of the techniques described herein may be provided as part of a third-party semantic processing service whereby a third party provides semantic processing services to a company to assist the company in providing customer service to its customers.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for suggesting a product upsell to a customer service representative during a conversation between the customer service representative and a first customer, the method comprising:

receiving information about the first customer from a data store of customer information;

computing customer features from the information about the first customer;

receiving information about a plurality of messages between the first customer and the customer service representative;

computing conversation features from the information about the plurality of messages;

determining to suggest an upsell to the customer service representative by processing the conversation features with a first classifier;

computing, in response to determining to suggest the upsell, a first plurality of scores by processing the customer features with a second classifier, wherein each score of the first plurality of scores corresponds to a respective product of a plurality of products;

determining customer data indicating products provided to other customers;

performing collaborative filtering using the customer features and the customer data to generate a second plurality of scores, wherein each score of the second plurality of scores corresponds to a respective product of the plurality of products;

computing a third plurality of scores by interpolating the first plurality of scores and the second plurality of scores, wherein each score of the third plurality of scores corresponds to a respective product of the plurality of products;

using the third plurality of scores, selecting a first product from the plurality of products based at least in part on a score corresponding to the first product; and causing presentation, to the customer service representative, of a suggestion to upsell the first product to the first customer.

2. The computer-implemented method of claim 1, comprising:

receiving information about a subsequent message between the first customer and the customer service representative;

computing third conversation features using the information about the subsequent message; and determining to not suggest an upsell to the customer service representative by processing the third conversation features with the first classifier.

3. The computer-implemented method of claim 1, wherein the conversation features comprise context features.

4. The computer-implemented method of claim 1, wherein the customer features comprise information about products previously provided to the first customer.

5. The computer-implemented method of claim 1, wherein determining to suggest the upsell comprises:

computing a second score using the first classifier, the conversation features and the customer features; and determining to suggest the upsell based on the second score meeting a threshold.

6. The computer-implemented method of claim 1, further comprising:

comparing each score of the first plurality of scores to a threshold; and wherein the first product is a product with a highest score.

7. The computer-implemented method of claim 1, wherein determining to suggest the upsell comprises processing the customer features with the first classifier.

8. A system for suggesting a product upsell to a customer service representative during a conversation between the customer service representative and a first customer, the system comprising:

at least one server computer comprising at least one processor and at least one memory, the at least one server computer configured to:

receive information about the first customer from a data store of customer information;

compute customer features from the information about the first customer;

receive information about a message between the first customer and the customer service representative;

compute conversation features from the information about the message;

determine to suggest an upsell to the customer service representative by processing the conversation features with a first classifier;

compute, in response to the determination to suggest the upsell, a first plurality of scores by processing the customer features using a second classifier, wherein each score of the first plurality of scores corresponds to a respective product of a plurality of products;

determine customer data indicating products provided to other customers;

perform collaborative filtering using the customer features and the customer data to generate a second plurality of scores, wherein each score of the second plurality of scores corresponds to a respective product of the plurality of products;

compute a third plurality of scores by interpolating the first plurality of scores and the second plurality of scores, wherein each score of the third plurality of scores corresponds to a respective product of the plurality of products;

using the third plurality of scores, select a first product from the plurality of products based at least in part on a score corresponding to the first product; and cause presentation, to the customer service representative, of a suggestion to upsell the first product to the first customer.

9. The system of claim 8, wherein the conversation features comprise sentiment features.

10. The system of claim 8, wherein the at least one server computer is configured to:

receive information about a second subsequent message between the first customer and the customer service representative;

compute third conversation features using the information about the second subsequent message;

determine to suggest an upsell to the customer service representative by processing the third conversation features with the first classifier;

determine a second product from the plurality of products by processing the customer features with the second classifier; and cause presentation, to the customer service representative, of a suggestion to upsell the second product to the first customer.

11. The system of claim 8, wherein the at least one server computer is configured to:

determine to suggest an upsell to the customer service representative by generating a boolean value using the first classifier, wherein the boolean value indicates whether to suggest an upsell to the customer service representative.

12. The system of claim 8, wherein the at least one server computer is configured to:
- receive an indication from the customer service representative to upsell the first product to the first customer; and
- transmit a message, to a device used by the first customer, offering the first product to the first customer, wherein the message was not generated by the customer service representative.

13. The system of claim 8, wherein the conversation features comprise context features, topic features, and sentiment features.

14. The system of claim 8, wherein the at least one server computer is configured to select the first product using the conversation features.

15. One or more non-transitory computer-readable media comprising computer executable instructions that, when executed, cause at least one processor to perform actions comprising:
- receiving information about a first customer from a data store of customer information;
- computing customer features from the information about the first customer;
- receiving information about a message between the first customer and a customer service representative;
- computing conversation features from the information about the message;
- determining to suggest an upsell to the customer service representative by processing the conversation features with a first classifier;
- computing, in response to determining to suggest the upsell, a first plurality of scores by processing the customer features with a second classifier, wherein each score of the first plurality of scores corresponds to a respective product of a plurality of products;
- determining customer data indicating products provided to other customers;
- performing collaborative filtering using the customer features and the customer data to generate a second plurality of scores, wherein each score of the second plurality of scores corresponds to a respective product of the plurality of products;
- computing a third plurality of scores by interpolating the first plurality of scores and the second plurality of scores, wherein each score of the third plurality of scores corresponds to a respective product of the plurality of products;
- using the third plurality of scores, selecting a first product from the plurality of products based at least in part on a score corresponding to the first product; and
- causing presentation, to the customer service representative, of a suggestion to upsell the first product to the first customer.

16. The one or more non-transitory computer-readable media of claim 15, wherein the conversation features comprise topic features.

17. The one or more non-transitory computer-readable media of claim 15, wherein the actions comprise:
- selecting a second product from the plurality of products by processing the customer features with the second classifier; and
- causing presentation, to the customer service representative, of a suggestion to upsell the second product to the first customer.

18. The one or more non-transitory computer-readable media of claim 15, wherein the first classifier generates a boolean value indicating whether to suggest an upsell to the customer service representative.

19. The one or more non-transitory computer-readable media of claim 15, wherein the first classifier comprises a support vector machine and the second classifier comprises a multinomial logistic regression classifier.

\* \* \* \* \*